US012789796B2

(12) United States Patent
Fukui

(10) Patent No.: US 12,789,796 B2
(45) Date of Patent: Nov. 10, 2026

(54) VEHICLE CONTROL APPARATUS, VEHICLE CONTROL METHOD, AND NON-TRANSITORY COMPUTER-READABLE MEDIUM THEREOF

(71) Applicant: TOYOTA JIDOSHA KABUSHIKI KAISHA, Toyota (JP)

(72) Inventor: Yusuke Fukui, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 19/079,135

(22) Filed: Mar. 13, 2025

(65) Prior Publication Data

US 2025/0326392 A1 Oct. 23, 2025

(30) Foreign Application Priority Data

Apr. 18, 2024 (JP) ................................ 2024-067377

(51) Int. Cl.

*B60W 30/00* (2006.01)
*B60W 30/09* (2012.01)
*B60W 30/095* (2012.01)
*B60W 30/14* (2006.01)
*B60W 50/14* (2020.01)

(52) U.S. Cl.

CPC ........ *B60W 30/09* (2013.01); *B60W 30/0956* (2013.01); *B60W 30/146* (2013.01);
(Continued)

(58) Field of Classification Search

CPC ............. B60W 30/09; B60W 30/0956; B60W 30/146; B60W 50/14; B60W 2050/143;
(Continued)

(56) References Cited

U.S. PATENT DOCUMENTS

2005/0275514 A1* 12/2005 Roberts .................... B60Q 5/00 340/436
2015/0035990 A1* 2/2015 Forchheimer ........... G06T 7/579 348/169

(Continued)

FOREIGN PATENT DOCUMENTS

JP 2001195699 A * 7/2001 ............. G01S 11/12
JP 2004051006 A * 2/2004

(Continued)

*Primary Examiner* — Peter D Nolan
*Assistant Examiner* — Peter Y Ning
(74) *Attorney, Agent, or Firm* — Oliff PLC

(57) ABSTRACT

A vehicle control apparatus comprises; a frontward sensor device configured to repeatedly detect a structure located in an area between a left-front diagonal and a right-front diagonal of a vehicle to obtain a position of the structure; and a controller configured to execute a vehicle control. The controller is configured to: store the position of the structure every time the position is obtained by the frontward sensor device; extrapolate a position of a structure currently located around the vehicle, based on the position of the structure that is currently obtained by the frontward sensor device and the stored position of the structure; and execute the vehicle control, based on the extrapolated position of the structure currently located around the vehicle in a period in which the vehicle is assumed to be making a left turn or a right turn.

5 Claims, 6 Drawing Sheets

(52) U.S. Cl.
CPC ....... *B60W 50/14* (2013.01); *B60W 2050/143* (2013.01); *B60W 2050/146* (2013.01); *B60W 2554/20* (2020.02); *B60W 2554/80* (2020.02)

(58) Field of Classification Search
CPC ....... B60W 2050/146; B60W 2554/20; B60W 2554/80; B60W 2540/20; B60W 2554/801; B60W 30/18145; B60W 30/18159
See application file for complete search history.

(56) References Cited

U.S. PATENT DOCUMENTS

| | | | | |
|---|---|---|---|---|
| 2017/0352270 | A1 | 12/2017 | Tanaka et al. | |
| 2019/0100196 | A1* | 4/2019 | Ueda | B60W 30/09 |
| 2019/0106111 | A1* | 4/2019 | Matsunaga | B60W 30/18154 |
| 2019/0185018 | A1* | 6/2019 | Tao | B60W 30/0956 |
| 2019/0225150 | A1* | 7/2019 | Nohl | G01S 13/931 |
| 2019/0225219 | A1* | 7/2019 | Ueda | B60W 30/16 |
| 2021/0024061 | A1* | 1/2021 | Visintainer | B60W 30/0956 |
| 2021/0245762 | A1* | 8/2021 | Tsuru | B60W 30/18145 |
| 2021/0394752 | A1* | 12/2021 | Satoh | B60W 30/09 |
| 2024/0034320 | A1* | 2/2024 | Hidaka | B60W 30/18159 |

FOREIGN PATENT DOCUMENTS

| | | | | | |
|---|---|---|---|---|---|
| JP | 2005-128722 | A | | 5/2005 | |
| JP | 2015079330 | A | * | 4/2015 | |
| JP | 2016-085486 | A | | 5/2016 | |
| JP | 2018173399 | A | * | 11/2018 | |
| KR | 20210102540 | A | * | 8/2021 | B60W 30/095 |
| WO | WO-2024018682 | A1 | * | 1/2024 | G08G 1/166 |

* cited by examiner

VEHICLE CONTROL APPARATUS, VEHICLE CONTROL METHOD, AND NON-TRANSITORY COMPUTER-READABLE MEDIUM THEREOF

TECHNICAL FIELD

The present disclosure relates to a vehicle control apparatus, a vehicle control method, and a non-transitory computer-readable medium having stored a program thereof, for executing a vehicle control (e.g., a warning and/or a deceleration control) to avoid a contact of a turning inner part of a vehicle with a structure when the vehicle is making a right turn or a left turn.

BACKGROUND

A conventional apparatus calculates a distance X between a vehicle and a road end object having a length equal to or longer than a predetermined length in a traveling direction of a road, using "a millimeter wave or a radar" irradiated leftward of the vehicle.

The conventional apparatus issues a warning to avoid an accident involving a motorcycle, when the distance X is equal to or shorter than an upper limit and is equal to or longer a lower limit, while a left turn signal indicator is operating (refer to Japanese Patent Application Laid-Open No. 2015-79330).

SUMMARY

A vehicle may not necessarily be equipped with a radar that emits radio waves to the left of the vehicle. Whereas, a vehicle often comprises a frontward sensor device configured to obtain information an object that is present in a front region (i.e., a region between the left diagonal to the right diagonal) of the vehicle, in order to avoid a collision with the object. Such a frontward sensor device may be a frontward camera device and/or a frontward radar device, for example.

Meanwhile, there may be a structure, such as a building and a wall, at "a near left side corner or a near right side corner" of an intersection at which the vehicle is going to make turns. As shown in FIG. 2B and FIG. 3A, when the vehicle is traveling at a position far from the intersection to some extent, such a structure can be detected by the frontward sensor device. However, as shown in FIG. 3B, when the vehicle approaches the intersection, such a structure is often located outside of a detection possible area of the frontward sensor device. In such a case, when the vehicle is making a left turn or a right turn, the frontward sensor device cannot detect such a structure. Thus, if a driver steers the vehicle more than necessary, the turning inner part of the vehicle is likely to contact/collide with the structure.

The present disclosure is made to cope with the problem described above. That is, one of the objects of the present disclosure is to provide a vehicle control apparatus, a vehicle control method, and a non-transitory computer-readable medium having stored a program thereof, that can reduce a possibility that the turning inner part of the vehicle comes in contact with the structure when the vehicle is making a left turn or a right turn.

The vehicle control apparatus according to one of embodiments of the present disclosure comprises: a frontward sensor device (20, 30) configured to repeatedly detect a structure located in a predetermined area between a left-front diagonal (L) of a vehicle and a right-front diagonal (R) of the vehicle, so as to obtain a position of the structure with respect to the vehicle; and a controller (10, 50, 70) configured to execute a vehicle control including at least one of a warning to a driver of the vehicle or a deceleration control to decelerate the vehicle.

The controller is configured to: store the position of the structure with respect to the vehicle every time the position of the structure with respect to the vehicle is obtained by the frontward sensor device (S410); extrapolate a position of a structure that is currently located around the vehicle with respect to the vehicle, based on the position of the structure with respect to the vehicle that is currently obtained by the frontward sensor device and the stored position of the structure with respect to the vehicle (S420); and execute the vehicle control, based on the extrapolated position of the structure that is currently located around the vehicle with respect to the vehicle (S510-S530, and S540-S560), in a period in which the vehicle is assumed to be making a left turn or a right turn (XLTR=1, XRTR=1).

According to the above-described embodiment, the "position of the structure that is currently located around the vehicle" with respect to the vehicle is extrapolated, based on the position of the structure with respect to the vehicle that is currently obtained by the frontward sensor device and the stored position of the structure with respect to the vehicle; and the vehicle control is executed, based on the extrapolated position of the structure in the period in which the vehicle is assumed to be making a left turn or a right turn. Accordingly, the vehicle control is executed taking into consideration the position of the structure that cannot currently be obtained by the frontward sensor device. Thus, it is possible to reduce a possibility that the turning inner part of the vehicle contacts with (or collides with) the structure while the vehicle is making a left turn or a right turn.

In the above-described embodiment, the controller is configured to:

estimate a distance (DL, DR) between a turning inner part of the vehicle and the structure that is currently located around the vehicle, based on the extrapolated position of the structure with respect to the vehicle, in the period in which the vehicle is assumed to be making a left turn or a right turn (S510, S540); and execute the vehicle control (S515-S530, S545-S560) when the estimated distance is equal to or shorter than a predetermined threshold (DL1th, DL2th, DR1th, DR2th).

According to the above-described embodiment, it is possible to reduce the possibility that the turning inner part of the vehicle contacts/collides with the structure with more certainty.

In the above-described embodiment, in a period in which a specific direction indicator, which is either one of a left direction indicator of the vehicle or a right direction indicator of the vehicle, is in a blinking-state, the controller is configured to be able to execute the vehicle control, when at least a part of the structure is located between a position that is first lateral distance (X1) away from a center in a vehicle width direction of the vehicle toward a turning direction of the vehicle indicated by the specific direction indicator and a position that is second lateral distance (X2) away from the center in the vehicle width direction of the vehicle toward the turning direction; and at least the part of the structure is located between a position that is first longitudinal distance (Y1) away from a front end of the vehicle in a rear direction and a position that is second longitudinal distance (Y2)

away from the front end of the vehicle in a front direction (S440, S450, S505: Yes, S470, S480, S535: Yes).

According to the above-described embodiment, it is possible to reduce a frequency that the vehicle control is executed against a structure that does not exist, due to an erroneous detection of that structure by the frontward sensor device.

Notably, in the above description, in order to facilitate understanding of the present disclosure, the constituent elements corresponding to those of an embodiment which will be described later are accompanied by parenthesized symbols and/or names which are used in the embodiment; however, the constituent elements of the disclosure are not limited to those in the embodiment defined by the symbols and/or names. The present disclosure also covers a vehicle control method and a non-transitory computer readable medium having stored program thereof.

DETAILED DESCRIPTION (Configuration)

A vehicle control apparatus (hereinafter, referred to as an "apparatus DS") according to an embodiment of the present disclosure comprises elements shown in FIG. 1, and is applied to (i.e., is mounted on) a vehicle (namely, a host vehicle) HV. The vehicle HV may be a vehicle having an internal combustion engine as a drive source, a vehicle having an electric motor as the drive source (namely, an electric vehicle), or a hybrid vehicle.

In the present specification, an ECU means an electronic control device (i.e., a control unit) comprising a microcomputer. The microcomputer includes a CPU (i.e., a processor), a ROM (i.e., a non-transitory computer readable medium), a RAM, a data writable involatile memory, and an interface. The CPU realizes various functions by executing instructions (routines) stored in the memory (i.e., the ROM). For example, a driving assistance ECU 10 comprises a CPU 10*a*, a ROM 10*b*, a RAM 10*c*, an involatile memory 10*d*, and an interface 10*e*. The ECU is referred to as a controller or a computer. The ECUs shown in FIG. 1 are connected to each other through Controller Area Network (CAN) in such a manner that they can exchange data with each other. All or some of a plurality of these ECUs are integrated into a single ECU. In addition, one of the ECUs may be implemented by a plurality of ECUs.

Figure 1:
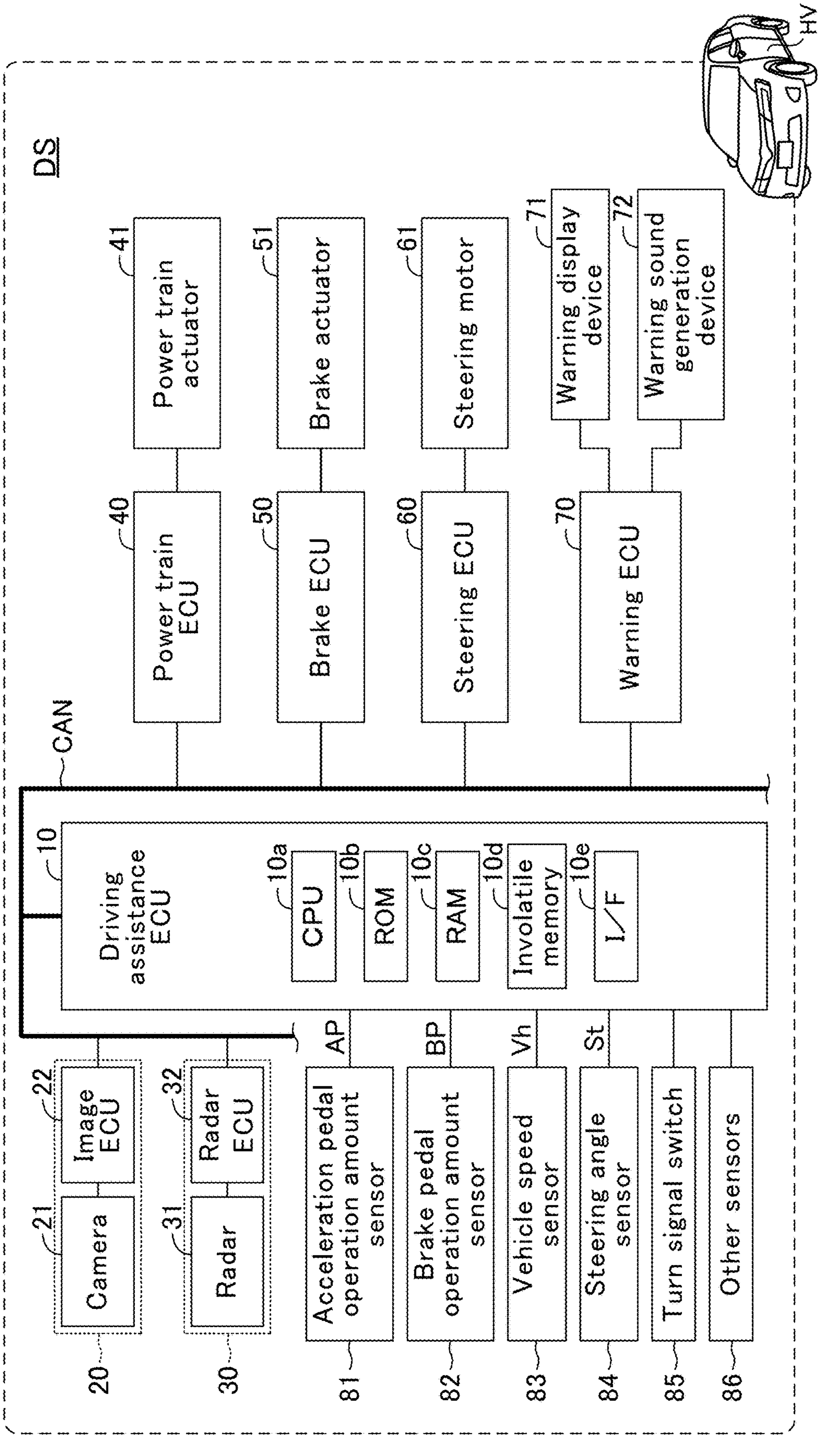
FIG. 1 is a schematic diagram of a vehicle control apparatus according to an embodiment of the present disclosure.

The driving assistance ECU 10, using the elements shown in FIG. 1, executes a "vehicle control (i.e., a contact/collision avoidance control) including at least a warning to a driver of the vehicle HV or a deceleration control to decelerate the vehicle HV" in order to avoid a contact/collision between the vehicle HV and a structure when the vehicle is making a right turn or a left turn.

Figure 2A:
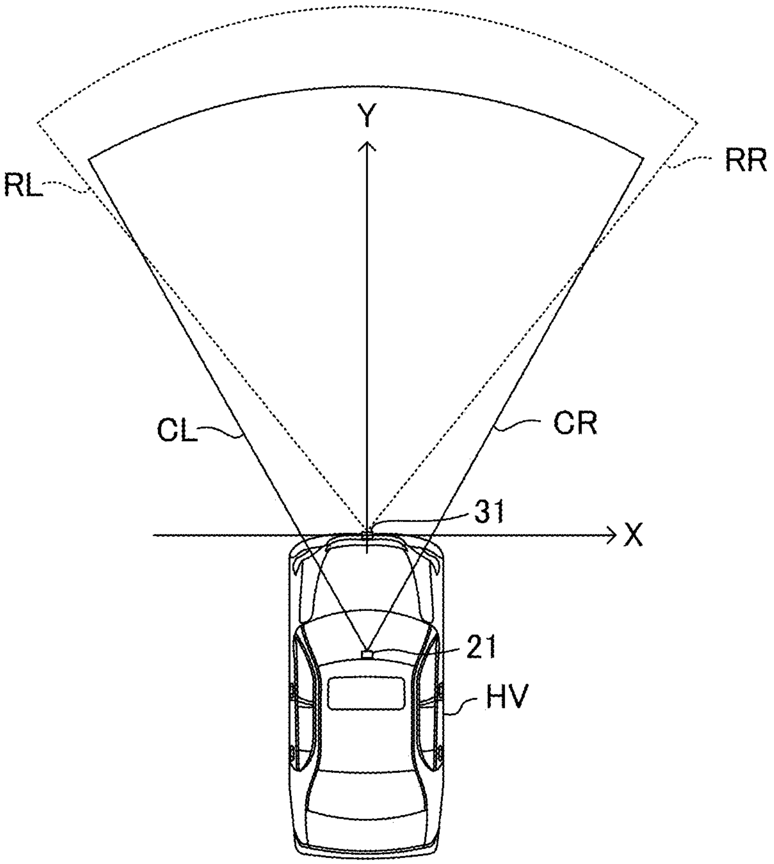
FIG. 2A is a plan view of a vehicle.

The camera device (i.e., a frontward camera device) 20 includes a camera (i.e., frontward camera) 21 and an image ECU 22. As shown in FIG. 2A, the camera 21 is disposed at a central position in a vehicle width direction of a front windshield of the vehicle HV and an upper position of the front windshield. The camera 21 obtains image data by repeatedly taking a picture of a scene of a "predetermined area in front of the vehicle HV (namely, an area between a left-front diagonal shown by a straight line CL and a right-front diagonal shown by a straight line CR) of the vehicle, every time a predetermined time elapses. The image ECU 22 produces camera information by analyzing the image data from the camera 21, and transmits the camera information to the driving assistance ECU 10. The camera information includes the image data itself, and camera object information including "a position with respect to the vehicle HV, a relative speed, a relative lateral speed, and a type" of the object of which picture has been taken. The type of the object includes a "moving object such as an other vehicle and a pedestrian" and a "structure that does not move such as a building and a wall".

The radar device (i.e., the frontward radar device) 30 includes a radar (i.e., a frontward radar) 31 and a radar ECU 32. As shown in FIG. 2A, the radar 31 is disposed at a central position in the vehicle width direction of the front end of the vehicle HV. The radar 31 transmits/radiates a millimeter wave in a "predetermined area in front of the vehicle HV (namely, an area between a left-front diagonal shown by a straight line RL and a right-front diagonal shown by a straight line RR)" every time a predetermined time elapses, and receives a millimeter wave that is reflected at an object. The radar transmits information on the transmitted and received millimeter waves to the radar ECU 32. The radar ECU 32 obtains radar information based on the information sent from the radar 31, and transmits the radar information to the driving assistance ECU 10. The radar information includes a distance to the object, an azimuth of the object, and the relative speed of the object.

The driving assistance ECU 10 fuses the camera information and the radar information to produce fusion object information every time a predetermined time elapses. The fusion object information includes a position of the object with respect to the vehicle HV (i.e., a distance to the object, a lateral position of the object, and an azimuth of the object), an outline of the object, a relative speed of the object, and a type of the object. The driving assistance ECU 10 defines a position of the object using an X-Y coordinate system based on the vehicle HV. As shown in FIG. 2A, a Y axis of the X-Y coordinate system extends in a front-rear direction of the vehicle HV, and an X axis of the X-Y coordinate system extends in a direction orthogonal to the Y axis. The origin of the X-Y coordinate system is at a central position in the vehicle width direction of the front end of the vehicle HV. The Y-axis coordinate takes a positive value in front of the vehicle HV, and the X-axis coordinate takes a positive value to the right of the vehicle HV.

Figure 3A:
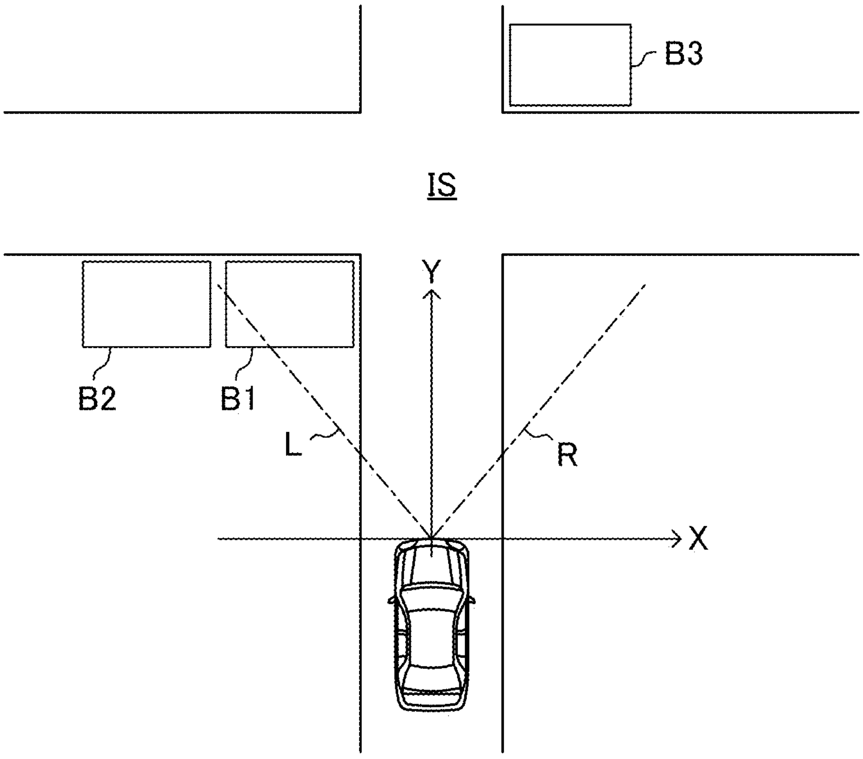
FIG. 3A is a plan view of the vehicle moving to the intersection and structures around the intersection.

In this manner, the camera device 20 and the radar device 30 repeatedly detect structure(s) that is(are) present in a predetermined area between the left-front diagonal (i.e., roughly a direction in which a straight line L shown in FIG. 3A extends) and the right-front diagonal (i.e., roughly a direction in which a straight line R shown in FIG. 3A extends), to constitute a front sensor device configured to obtain a position of the structure with respect to the vehicle HV.

The power train ECU 40 drives a power train actuator 41 to control an unillustrated driving device including the drive source of the vehicle HV, so as to generate a driving force of the vehicle HV. The power train ECU 40 can adjust the driving force of the vehicle HV in response to an instruction signal transmitted from the driving assistance ECU 10.

The brake ECU 50 drives a brake actuator 51 to control an unillustrated brake device of the vehicle HV, so as to adjust a brake force applied to the vehicle HV. The brake ECU 50 can perform an automatic braking to fully stop the vehicle HV by automatically applying the braking force to the vehicle, in response to an instruction signal transmitted from the driving assistance ECU 10. This automatic braking may sometimes be referred to as a deceleration control to decelerate the vehicle HV.

The steering ECU 60 drives a steering motor 61 to control an unillustrated steering device of the vehicle HV, so as to change a steering angle of the vehicle HV. The steering ECU 60 drives the steering motor 61 in response to an instruction signal transmitted from the driving assistance ECU 10, so as to autonomously steer the vehicle HV.

The warning ECU 70 is connected to a warning display device 71 that is disposed at a position so that the driver can visually recognize, and to a warning sound generation device 72 that can generate a warning sound. The warning ECU 70 causes the warning display device 71 to display a predetermined warning (warning signs), and causes the warning sound generation device 72 to generate the warning sound, in response to an instruction signal transmitted from the driving assistance ECU 10.

The driving assistance ECU 10 inputs detection values (i.e., output values) of "sensors and switches" described below.

An acceleration pedal operation amount sensor 81 configured to detect an acceleration pedal operation amount AP of the host vehicle HV.

A brake pedal operation amount sensor 82 configured to detect a brake pedal operation amount BP of the host vehicle HV.

A vehicle speed sensor 83 configured to detect a speed (i.e., host vehicle speed) Vh of the vehicle HV.

A steering angle sensor 84 configured to detect a steering angle St of the vehicle HV. The steering angle St becomes negative when a steering wheel is rotated to the left from a neutral position, and becomes positive when the steering wheel is rotated to the right from the neutral position.

A turn signal switch 85 configured to output signals indicative of a position of the turn signal lever that is operated by the driver in order to blink/flicker turn signal indicators (i.e., direction indicators) of the vehicle HV.

Other sensors 86 including a steering torque sensor, a yaw rate sensor, a front-rear direction acceleration sensor, and a lateral acceleration sensor.

Note that the driving assistance ECU 10 can blink a left direction indicator only among the left direction indicator and a right direction indicator, based on the output signals of the turn signal switch 85. Furthermore, the driving assistance ECU 10 can blink the right direction indicator only among the left direction indicator and the right direction indicator, based on the output signals of the turn signal switch 85. In addition, as is well known, the output signal of the turn signal switch 85 turns into an off-signal when the unillustrated steering wheel is rotated by more than a predetermined angle rightward while only the left direction indicator among the left direction indicator and the right direction indicator is blinking, so that the left direction indicator is changed into an off-state. Similarly, the output signal of the turn signal switch 85 turns into an off-signal when the unillustrated steering wheel is rotated by more than a predetermined angle leftward while only the right direction indicator among the left direction indicator and the right direction indicator is blinking, so that the right direction indicator is changed into an off-state.

(Outline of Operation)

Figure 2B:
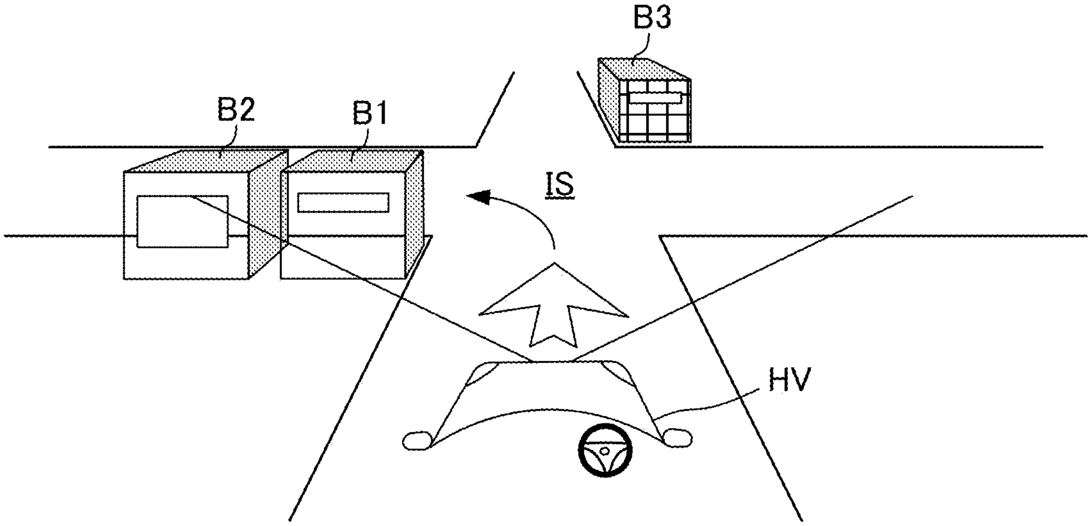
FIG. 2B is a view of an intersection seen from the vehicle moving to the intersection.

As shown in FIG. 2B, the vehicle HV sometimes make a left turn or a right turn at an intersection IS where structures B1, B2, B3, and so on (e.g., buildings) are located/present at a corner of the intersection IS. In such a case, if the steering operation is not appropriately performed, the turning inner part of the vehicle HV may contact with the structure. For instance, in the example shown in FIG. 2B, if the driver steers the vehicle HV too greatly more than necessary while the vehicle HV is making a left turn, the left side part of the vehicle HV which is the turning inner part of the vehicle HV may come in contact with the structure B1.

Figure 3B:
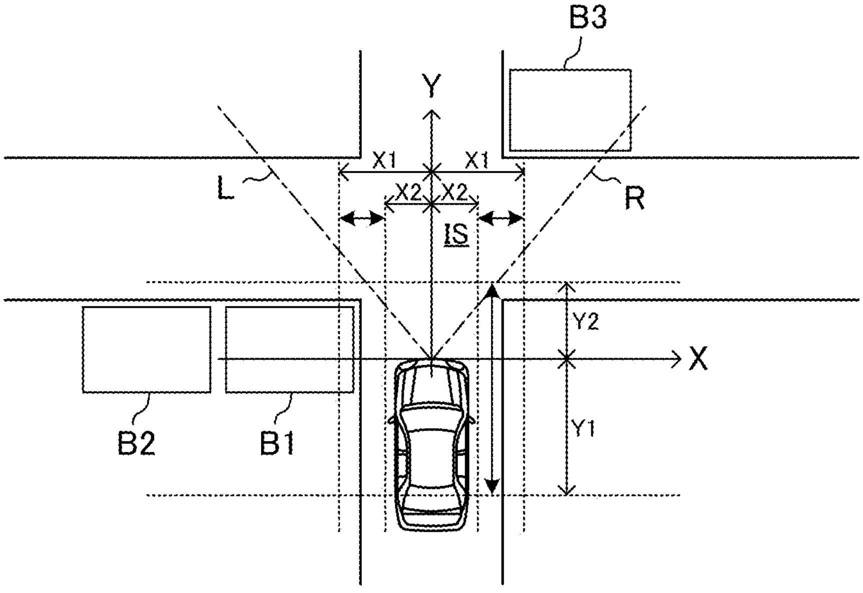
FIG. 3B is a plan view of the vehicle moving to the intersection and structures around the intersection.

Meanwhile, as shown in FIG. 3A, when the vehicle HV is traveling at a position far from the intersection IS to some extent, the structures located at the corner of the intersection IS (e.g., B1 to B3) are included in a predetermined area (i.e., the predetermined possible detection area between the straight line L and the straight line R) of the frontward sensor device. However, as shown in FIG. 3B, when the vehicle HV approaches the intersection IS, some of the structures located at the corner of the intersection IS (e.g., the structures B1 and B2) are no longer included in the possible detection area of the frontward sensor device. Therefore, when the vehicle HV is making a left turn at the intersection IS, for example, the conventional apparatus can not determine whether or not the vehicle HV has approached too closely to the structure(s), and thus, it can not perform the contact avoidance control as the vehicle control.

In view of the above, the driving assistance ECU 10 of the apparatus DS stores, in the RAM 10*c*, the position of the structure with respect to the vehicle HV, every time the ECU 10 obtains the position of the structure based on the information from the frontward sensor device. In addition, every time the ECU 10 newly obtains a current position of the structure with respect to the vehicle HV based on the information from the frontward sensor device, the driving assistance ECU 10 infers/estimates/extrapolates a position of a structure that is currently located around the vehicle HV with respect to the vehicle HV, based on the stored position of the structure with respect to the vehicle HV and the newly obtained position of the structure with respect to the vehicle HV. This enables the driving assistance ECU 10 to obtain a position of the structure which cannot be currently detected/recognized by the frontward sensor device.

Thereafter, the driving assistance ECU 10 successively estimates/extrapolates a distance (e.g., DL or DR) between the turning inner part of the vehicle HV and the structure whose position has been extrapolated, in a period where it is assumed that the vehicle HV is making a left turn or a right turn, and executes the contact/collision avoidance control when the extrapolated distance is equal to or shorter than a predetermined threshold. The predetermined threshold includes "a first left turn threshold DL1th, a second left turn threshold DL2th, a first right turn threshold DR1th, and a second right turn threshold DR2th" described later, for example.

(Specific Operation)

<Determination of Approaching Risk>

The CPU 10*a* of the driving assistance ECU 10 (hereinafter, simply referred to as a "CPU") executes a routine shown by a flowchart in FIG. 4, every time a predetermined time elapses. Hereinafter, "step" is expressed as "S".

Figure 4:
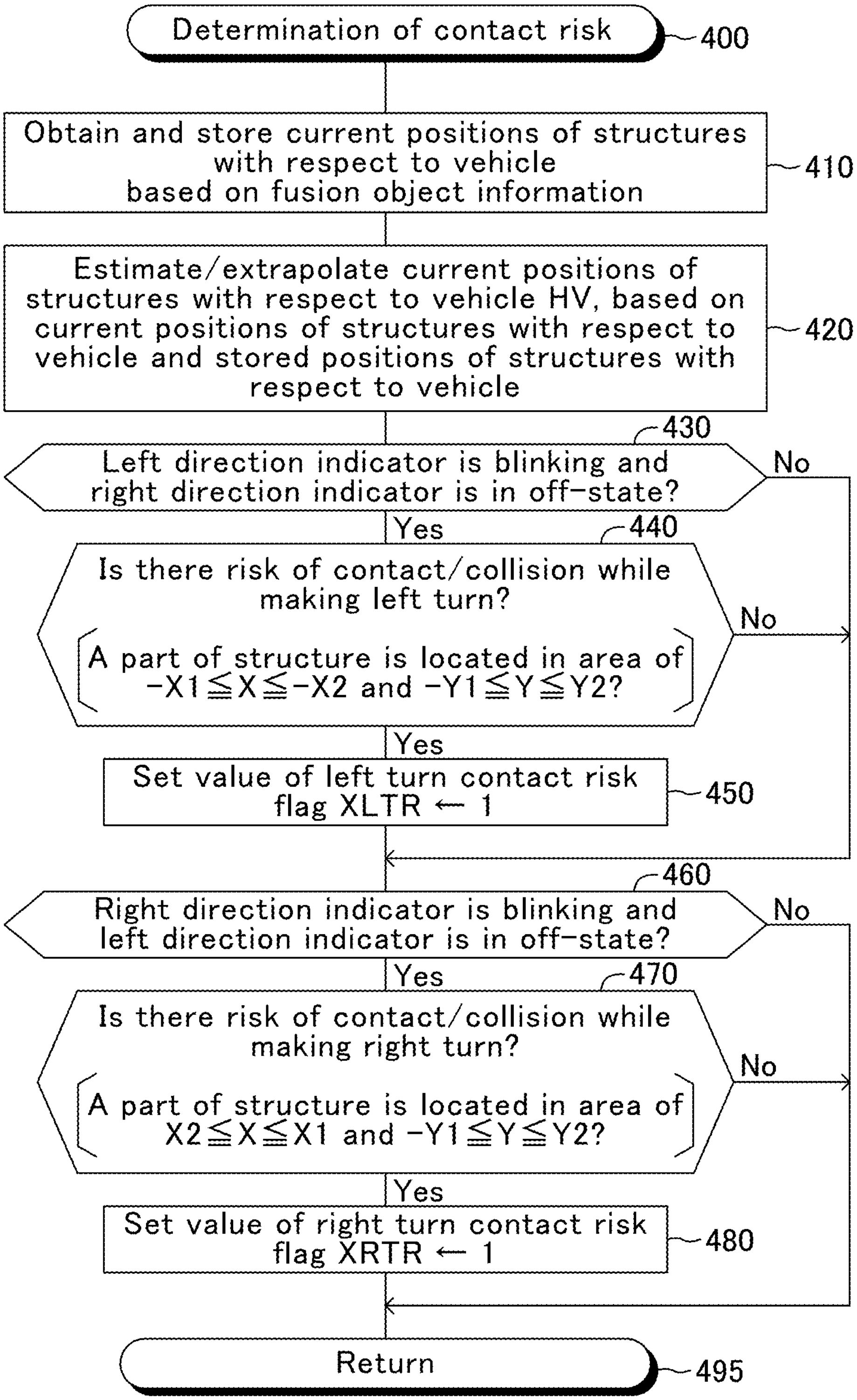
FIG. 4 shows a routine executed by a CPU of the driving assistance ECU shown in FIG. 1.

When an appropriate time point comes, the CPU starts processing from S400 shown in FIG. 4, and proceeds to S410. At S410, the CPU obtains the current positions of the structures with respect to the vehicle HV based on the fusion object information, and stores the current positions of the structures with respect to the vehicle HV in the RAM 10*c*.

Subsequently, the CPU proceeds to S420 to estimate/extrapolate the current positions of the structures with respect to the vehicle HV, based on the current positions of the structures with respect to the vehicle HV obtained based on the fusion object information and the positions of the structures with respect to the vehicle HV that have been stored up to the present time point in the RAM 10*c*. At this time, the CPU extracts object/objects that is/are common between the current fusion object information and the fusion object information that has been stored, and estimates/extrapolates the current positions of the structures with respect to the vehicle HV based on the current position(s) of the extracted common object(s) with respect to the vehicle HV. Therefore, the structure whose current position with respect to the vehicle HV is estimated/extrapolated includes a structure whose position that is not included in the currently obtained fusion object information but is included in the fusion object information that was obtained in the past and has been stored in the RAM 10*c*.

Subsequently, the CPU proceeds to S430, and determines whether or not the left direction indicator is blinking and the right direction indicator is in the off-state (namely, whether or not only of the left direction indicator among the left and right indicators is blinking), based on the signal from the turn signal switch 85. When only of the left direction indicator is not blinking, the CPU proceeds to S460 described later from S430.

Whereas, when only of the left direction indicator is blinking, the CPU assumes/infers that the vehicle HV is making a left turn. In this case, the CPU proceeds to S440 from S430, and determines whether or not there is a risk (probability) of a contact/collision between the vehicle HV and a structure when the vehicle is making the left turn. More specifically, as shown in FIG. 3B, when a part or all of a certain structure is located between "−X1 and −X2" of the X coordinate and between "−Y1 and Y2" of the Y coordinate, the CPU determines that there is a possibility (probability) that the vehicle HV contacts/collides with that certain structure. Both X1 and X2 are positive, and X1 is greater than X2 (e.g., X1=2(m), and X2=1(m)). X1 is referred to as a first lateral distance, and X2 is referred to as a second lateral distance. Both Y1 and Y2 are positive, and Y1 is greater than Y2 (e.g., Y1=3(m), and Y2=1(m)). Y2 is referred to as a first longitudinal distance, and X2 is referred to as a second longitudinal distance.

If there is no risk/probability that the vehicle HV contacts/collides with a structure when the vehicle HV make a left turn, the CPU proceeds to S460 from S440.

Whereas, if there is a risk/probability that the vehicle HV contacts/collides with a structure when the vehicle HV make a left turn, the CPU proceeds to S450 from S440. At S450, the CPU sets a value of a left turn contact risk flag XLTR to "1". Thereafter, the CPU proceeds to S460. Note that the value of the left turn contact risk flag XLTR and a value of a right turn contact risk flag XRTR described later are set to "0" through an unillustrated initialization routine executed by the CPU when a position of an unillustrated activation switch (e.g., an ignition key switch, or a ready switch) of the vehicle HV is changed from an off-position to an on-position.

When the CPU proceeds to S460, the CPU determines whether or not the right direction indicator is blinking and the left direction indicator is in the off-state (namely, whether or not only of the right direction indicator among the left and right indicators is blinking), based on the signal from the turn signal switch 85. When only of the right direction indicator is not blinking, the CPU proceeds to S495 from S460 to terminate the present routine tentatively.

Whereas, when only of the right direction indicator is blinking, the CPU assumes/infers that the vehicle HV is making a right turn. In this case, the CPU proceeds to S470 from S460, and determines whether or not there is a risk (probability) of a contact/collision between the vehicle HV and a structure when the vehicle is making the right turn. More specifically, as shown in FIG. 3B, when a part or all of a certain structure is located between "X2 and X1" of the X coordinate and between "−Y1 and Y2" of the Y coordinate, the CPU determines that there is a possibility (probability) that the vehicle HV contacts/collides with that certain structure.

If there is no risk/probability that the vehicle HV contacts/collides with a structure when the vehicle HV make a right turn, the CPU proceeds to S495 from S470.

Whereas, if there is a risk/probability that the vehicle HV contacts/collides with a structure when the vehicle HV make a right turn, the CPU proceeds to S480 from S470. At S480, the CPU sets a value of the right turn contact risk flag XRTR to "1". Thereafter, the CPU proceeds to S495.

<Vehicle Control>

Figure 5:
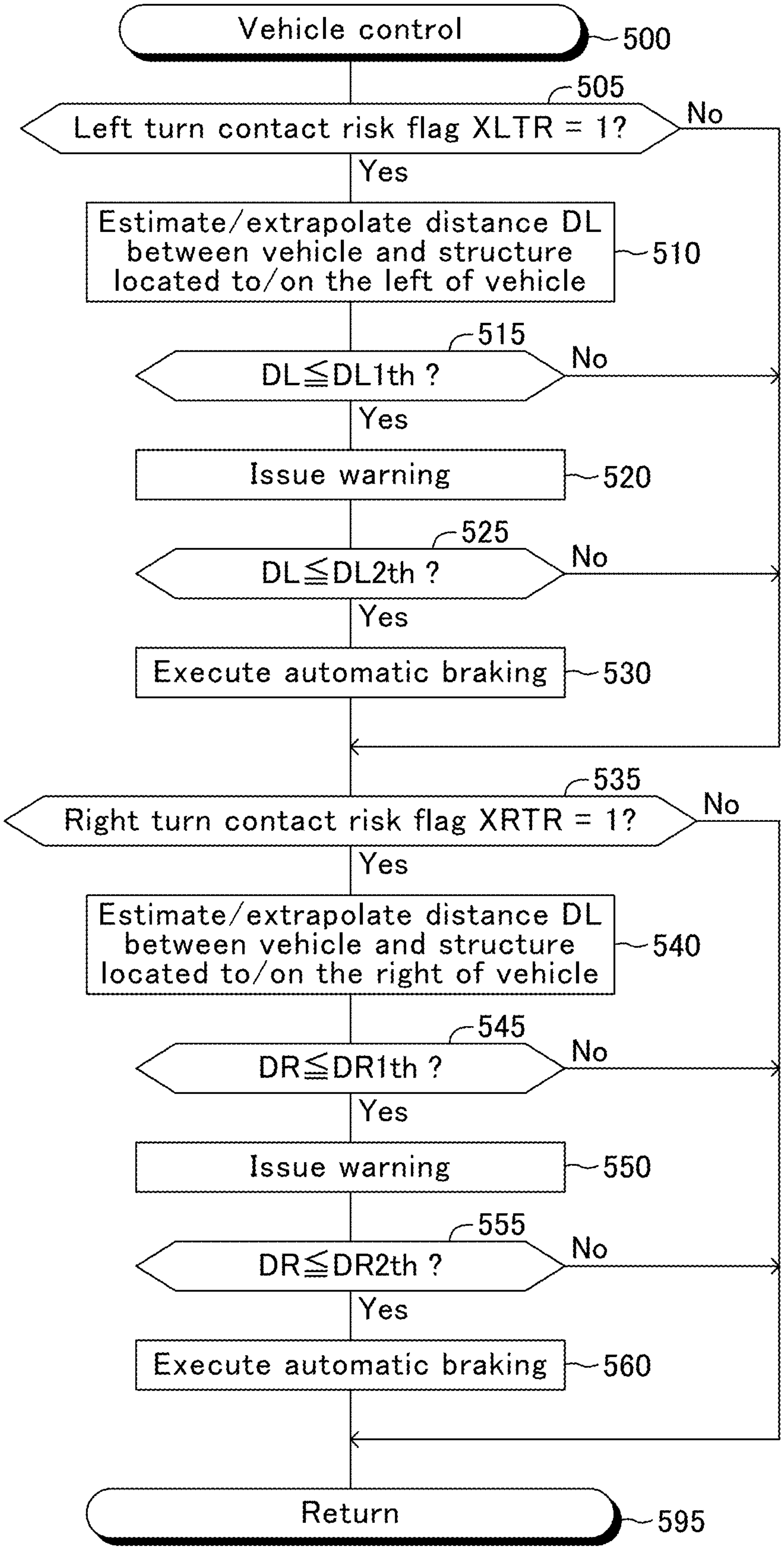
FIG. 5 shows another routine executed by the CPU of the driving assistance ECU shown in FIG. 1.

The CPU executes a routine shown by a flowchart in FIG. 5, every time a predetermined time elapses. When an appropriate time point comes, the CPU starts processing from S500 shown in FIG. 5, and proceeds to S505. At S505, the CPU determines whether or not the value of the left turn contact risk flag XLTR is "1".

When the value of the left turn contact risk flag XLTR is "1", the CPU proceeds to S510 from S505. At step S510, the CPU estimates/extrapolates, based on the current position of the structure with respect to the vehicle HV that has been estimated/extrapolated at S420, a distance DL between the turning inner part of the vehicle HV (in this case the left side part of the vehicle HV) and the structure that is assumed/inferred to be located to the left of the vehicle HV.

Subsequently, the CPU proceeds to S515 to determine whether or not the distance DL is equal to or shorter than "the first left turn threshold DL1th that is shorter than the second lateral distance X2". When the distance DL is equal to or shorter than the first left turn threshold DL1th, the CPU proceeds to S520 from S515 to transmit, to the warning ECU 70, an instruction signal that causes the warning ECU 70 to issue the warning. When the warning ECU 70 receives this instruction signal, the warning ECU 70 causes the warning display device 71 to display the warning sign, and causes the warning sound generation device 72 to generate the warning sound. At this time, the warning ECU 70 may issue "a warning sign and/or a warning sound (e.g., a message)" indicating that there may be a risk that the left side of the vehicle HV contacts/collides with the structure. This causes the driver of the vehicle HV to recognize the risk that the left side of the vehicle HV contacts/collides with the structure that is assumed to be located to the left of the vehicle HV.

Therefore, the driver can perform an appropriate driving operation in order to avoid that contact/collision.

Subsequently, the CPU proceeds to S525. At S525, the CPU determine whether or not the distance DL obtained at S510 is equal to or shorter than the second left turn threshold DL2th. The second left turn threshold DL2th has been set at a value equal to or smaller than the first left turn threshold DL1th.

When the distance DL is equal to or shorter than the second left turn threshold DL2th, the CPU proceeds to S530 from S525 to transmit an instruction signal to the brake ECU 50. When the brake ECU 50 receives this instruction signal, the brake ECU 50 executes an automatic braking so as to immediately fully stop the vehicle HV. This can reduce the possibility that the left side part of the vehicle HV contacts/collide with the structure that is assumed to be located to the left of the vehicle HV. Thereafter, the CPU proceeds to S535.

Note that, when the CPU makes a "No" determination at any one of S505, S515, and S525, the CPU directly proceeds to S535 from the step at which the CPU makes the "No" determination.

When the CPU proceeds to S535, the CPU determines whether or not the value of the right turn contact risk flag XRTR is "1".

When the value of the right turn contact risk flag XRTR is "1", the CPU proceeds to S540 from S535. At step S540, the CPU estimates/extrapolates, based on the current position of the structure with respect to the vehicle HV that has been estimated/extrapolated at S420, a distance DR between the turning inner part of the vehicle HV (in this case the right side part of the vehicle HV) and the structure that is assumed/inferred to be located to the right of the vehicle HV.

Subsequently, the CPU proceeds to S545 to determine whether or not the distance DR is equal to or shorter than "the first right turn threshold DR1th that is shorter than the second lateral distance X2". The first right turn threshold DR1th has been set at a value that is the same as the value of the first left turn threshold DL1th. When the distance DR is equal to or shorter than the first right turn threshold DR1th, the CPU proceeds to S550 from S545 to transmit, to the warning ECU 70, the instruction signal that causes the warning ECU 70 to issue the warning. When the warning ECU 70 receives this instruction signal, the warning ECU 70 causes the warning display device 71 to display the warning sign, and causes the warning sound generation device 72 to generate the warning sound. At this time, the warning ECU 70 may issue "a warning sign and/or a warning sound (e.g., a message)" indicating that there may be a risk that the right side of the vehicle HV contacts/collides with the structure. This causes the driver of the vehicle HV to recognize the risk that the right side of the vehicle HV contacts/collides with the structure that is assumed to be located to the right of the vehicle HV. Therefore, the driver can perform an appropriate driving operation in order to avoid that contact/collision.

Subsequently, the CPU proceeds to S555. At S555, the CPU determine whether or not the distance DR obtained at S540 is equal to or shorter than the second right turn threshold DR2th. The second right turn threshold DR2th has been set at a value equal to or smaller than the first right turn threshold DR1th. The second right turn threshold DR2th has been set at a value that is the same as the value of the second left turn threshold DL2th.

When the distance DR is equal to or shorter than the second right turn threshold DR2th, the CPU proceeds to S560 from S555 to transmit an instruction signal to the brake ECU 50. When the brake ECU 50 receives this instruction signal, the brake ECU 50 executes the automatic braking so as to immediately fully stop the vehicle HV. This can reduce the possibility that the right side part of the vehicle HV contacts/collide with the structure that is assumed to be located to the right of the vehicle HV. Thereafter, the CPU proceeds to S595 to terminate the present routine tentatively.

Note that, when the CPU makes a "No" determination at any one of S535, S545, and S555, the CPU directly proceeds to S595 from the step at which the CPU makes the "No" determination.

<Reset of Flags>

Figure 6:
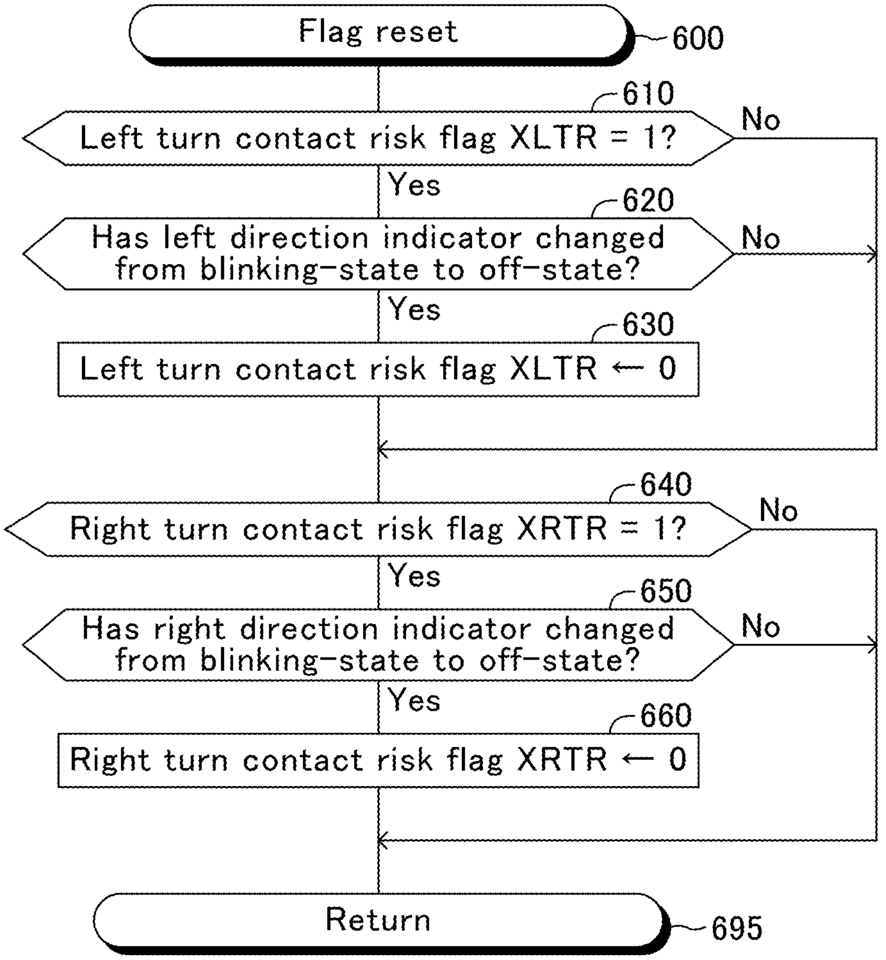
FIG. 6 shows yet another routine executed by the CPU of the driving assistance ECU shown in FIG. 1.

The CPU executes a routine shown by a flowchart in FIG. 6, every time a predetermined time elapses. When an appropriate time point comes, the CPU starts processing from S600 shown in FIG. 6, and proceeds to S610. At S610, the CPU determines whether or not the value of the left turn contact risk flag XLTR is "1".

When the value of the left turn contact risk flag XLTR is "1", the CPU proceeds to S620 from S610 to determine whether or not a state of the left direction indicator has changed from a blinking-state to an off-state. When the left direction indicator has changed from the blinking-state to the off-state, the CPU proceeds to S630 from S620 to set the value of the left turn contact risk flag XLTR to "0". Thereafter, the CPU proceeds to S640.

Note that, when the CPU makes a "No" determination at either one of S610 and S620, the CPU directly proceeds to S640 from the step at which the CPU makes the "No" determination.

When the CPU proceeds to S640, the CPU determines whether or not the value of the right turn contact risk flag XRTR is "1". When the value of the right turn contact risk flag XRTR is "1", the CPU proceeds to S650 from S640 to determine whether or not a state of the right direction indicator has changed from the blinking-state to the off-state. When the right direction indicator has changed from the blinking-state to the off-state, the CPU proceeds to S660 from S650 to set the value of the right turn contact risk flag XRTR to "0". Thereafter, the CPU proceeds to S695 to terminate the present routine tentatively.

Note that, when the CPU makes a "No" determination at either one of S640 and S650, the CPU directly proceeds to S695.

As has been described above, the apparatus DS, extrapolates/estimates a position of a structure that is currently located around the vehicle with respect to the vehicle, based on the position of the structure with respect to the vehicle that is currently obtained by the frontward sensor device and the stored position of the structure with respect to the vehicle; and executes the vehicle control (i.e., contact/collision avoidance control), based on the extrapolated position of the structure. Thus, the apparatus DS can effectively perform the vehicle control without being equipped with sensors for detecting structure immediately located to the left and to the right of the vehicle HV.

It should be noted that the present disclosure is not limited to the above embodiment, and may adopt various modifications within the scope of the present disclosure. For example, the driving assistance ECU 10 estimates/extrapolates the position of the structure with respect to the vehicle HV using the fusion object information, however, the driving assistance ECU 10 may estimates/extrapolate the position of the structure with respect to the vehicle HV using the camera information in place of the fusion object information. The driving assistance ECU 10 may determine that the vehicle HV is making a left turn in a period where the steering angle St of the vehicle HV is equal to or smaller than a predetermined negative threshold, and may determine that the vehicle HV is making a right turn in a period where the steering angle St of the vehicle HV is equal to or greater than a predetermined positive threshold.

For example, in a country with a law requiring vehicles to pass on the left side of the road, the first left turn threshold DL1th may be a value that is smaller than the first right turn threshold DR1th, and the second left turn threshold DL2th may be a value that is smaller than the second right turn threshold DR2th. In a country with a law requiring vehicles to pass on the right side of the road, the first left turn threshold DL1th may be a value that is greater than the first right turn threshold DR1th, and the second left turn threshold DL2th may be a value that is greater than the second right turn threshold DR2th. In addition, the present disclosure can be applied to an autonomous driving vehicle, when the vehicle driving mode of that autonomous driving vehicle is changed from an autonomous driving mode to a mode where the driver manually drives that autonomous vehicle.

What is claimed is:

1. A vehicle control apparatus comprising:

a frontward sensor device configured to repeatedly detect a structure located in a predetermined area between a left-front diagonal of a vehicle and a right-front diagonal of said vehicle, so as to obtain a position of said structure with respect to said vehicle; and a controller configured to execute a vehicle control including at least one of a warning to a driver of said vehicle or a deceleration control to decelerate said vehicle, wherein, said controller is configured to:

store said position of said structure with respect to said vehicle every time said position of said structure with respect to said vehicle is obtained by said frontward sensor device;

extrapolate a position of a structure that is currently located around said vehicle with respect to said vehicle, based on said position of said structure with respect to said vehicle that is currently obtained by said frontward sensor device and said stored position of said structure with respect to said vehicle; and execute said vehicle control, based on said extrapolated position of said structure that is currently located around said vehicle with respect to said vehicle, in a period in which said vehicle is assumed to be making a left turn or a right turn.

2. The vehicle control apparatus according to claim 1, wherein, said controller is configured to:

estimate a distance between a turning inner part of said vehicle and said structure that is currently located around said vehicle, based on said extrapolated position of said structure with respect to said vehicle, in said period in which said vehicle is assumed to be making a left turn or a right turn; and execute said vehicle control when said estimated distance is equal to or shorter than a predetermined threshold.

3. The vehicle control apparatus according to claim 2, wherein, in a period in which a specific direction indicator, which is either one of a left direction indicator of said vehicle or a right direction indicator of said vehicle, is in a blinking-state, said controller is configured to be able to execute said vehicle control, when at least a part of said structure is located between a position that is first lateral distance away from a center in a vehicle width direction of said vehicle toward a turning direction of said vehicle indicated by said specific direction indicator and a position that is second lateral distance away from said center in said vehicle width direction of said vehicle toward said turning direction; and at least said part of said structure is located between a position that is first longitudinal distance away from a front end of said vehicle in a rear direction and a position that is second longitudinal distance away from said front end of said vehicle in a front direction.

4. A vehicle control method including:

a step of repeatedly detecting a structure located in a predetermined area between a left-front diagonal of a vehicle and a right-front diagonal of said vehicle using a frontward sensor device, so as to obtain a position of said structure with respect to a vehicle;

a step of storing said position of said structure with respect to said vehicle every time said position of said structure with respect to said vehicle is obtained;

a step of extrapolating a position of a structure that is currently located around said vehicle with respect to said vehicle, based on said position of said structure with respect to said vehicle that is currently obtained and said stored position of said structure with respect to said vehicle; and a step of executing a vehicle control including at least one of a warning to a driver of said vehicle or a deceleration control to decelerate said vehicle, based on said extrapolated position of said structure that is currently located around said vehicle with respect to said vehicle, in a period in which said vehicle is assumed to be making a left turn or a right turn.

5. A non-transitory storage medium storing a program, said program causing a computer mounted on a vehicle to implement:

a step of repeatedly detecting a structure located in a predetermined area between a left-front diagonal of a vehicle and a right-front diagonal of said vehicle using a frontward sensor device, so as to obtain a position of said structure with respect to a vehicle;

a step of storing said position of said structure with respect to said vehicle every time said position of said structure with respect to said vehicle is obtained;

a step of extrapolating a position of a structure that is currently located around said vehicle with respect to said vehicle, based on said position of said structure with respect to said vehicle that is currently obtained and said stored position of said structure with respect to said vehicle; and a step of executing a vehicle control including at least one of a warning to a driver of said vehicle or a deceleration control to decelerate said vehicle, based on said extrapolated position of said structure that is currently located around said vehicle with respect to said vehicle, in a period in which said vehicle is assumed to be making a left turn or a right turn.

* * * * *